June 10, 1930.  A. D. BACH  1,763,610
SPRING FORMING AND HARDENING DEVICE
Filed Aug. 9, 1927  2 Sheets-Sheet 1
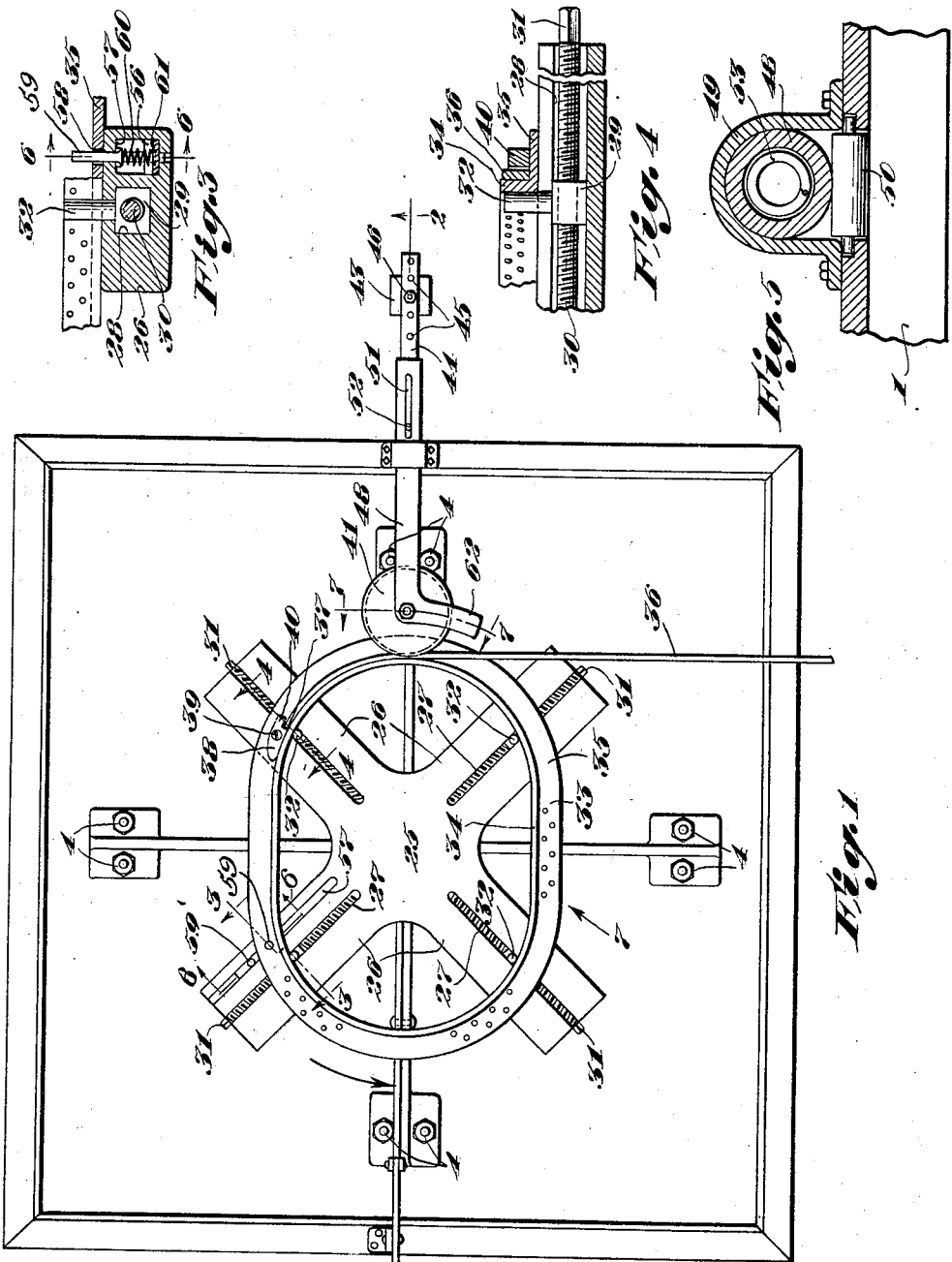

June 10, 1930.　　　A. D. BACH　　　1,763,610
SPRING FORMING AND HARDENING DEVICE
Filed Aug. 9, 1927　　2 Sheets-Sheet 2
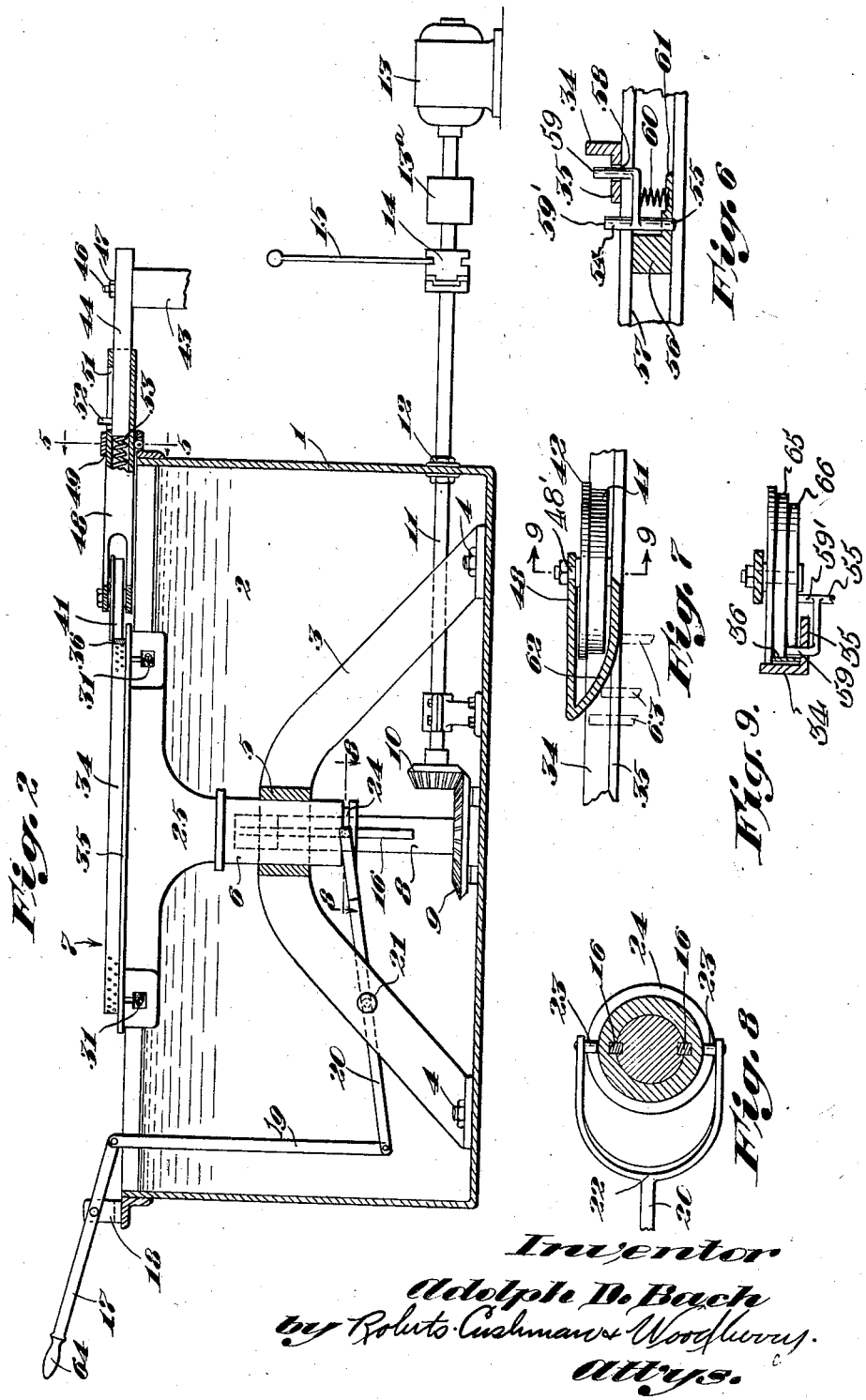

Patented June 10, 1930

1,763,610

UNITED STATES PATENT OFFICE

ADOLPH D. BACH, OF NEWTONVILLE, MASSACHUSETTS

SPRING FORMING AND HARDENING DEVICE

Application filed August 9, 1927. Serial No. 211,738.

This invention relates to metal working machines and more particularly to machines adapted to form an elongate strip of metal or other malleable material into a curved form and hold it in such position during a hardening process. It is especially adapted to bending up a hot strip of steel into a circular or oval form and hold it in such a position while it is being quenched to harden it, which process enters into the manufacture of certain types of springs.

Among the objects of the invention are to provide a machine which is substantially automatic and which is adapted to bend a strip of metal or other malleable material into any one of a number of predetermined curved forms and retain it in that position during a hardening process to which it may subsequently be subjected; and to provide a machine which is simple, cheap and efficient in the performance of these and other objects as may hereinafter appear.

I have chosen to illustrate and describe but one form of such a machine, but it is to be understood that this is in no way limiting upon the scope of the invention, which is limited solely by the appended claims.

In the drawings:

Fig. 1 is a plan view of the entire machine;

Fig. 2 is a section approximately on the line 2—2 in Fig. 1;

Fig. 3 is a section on the line 3—3 in Fig. 1;

Fig. 4 is a section on the line 4—4 in Fig. 1;

Fig. 5 is a section on the line 5—5 in Fig. 2;

Fig. 6 is a section on the line 6—6 in Figs. 1 and 3;

Fig. 7 is a section on the line 7—7 in Fig. 1;

Fig. 8 is a section on the line 8—8 in Fig. 2; and

Fig. 9 is a section of a modification taken in a position indicated by the line 9—9 in Fig. 7.

The device may consist of a tank 1 which may contain the hardening or quenching liquid 2, the forming means being located within the tank 1, so that the spring may be formed above the level of the liquid and thereafter lowered into it for quenching or hardening.

A supported spider 3 is fastened to the bottom of the tank 1 by any suitable means such as bolts 4 and has at its center a hub 5 which is adapted to receive the hub portion 6 of a table or table support generally indicated at 7. A vertical shaft 8 is mounted directly beneath and concentric with the hub 5 on a suitable thrust bearing at the bottom of tank 1 and has adjacent to its lower portion a bevel gear 9 which is engaged by a second bevel gear 10 on a shaft 11 passing through the side of the tank 1 in a suitable bearing 12 and may be driven in any desired manner, as for example by a motor 13 engageable with the shaft 11 through speed reducing gearing 13ª and a clutch 14 operated by a lever 15. The hub portion 6 is hollowed out to receive the upper end of the shaft 8 which is splined thereto as shown at 16 (Fig. 8). Means are provided for raising and lowering the table 7 which may comprise a hand lever 17 pivoted intermediate its ends to a bracket 18 rigid with the tank 1 and connected by a link 19 to a lever 20 pivoted at 21 to one arm of the spider 3. The end of the lever 20 opposite that connected to the link is bifurcated as shown at 22 (Fig. 8) and has its two ends provided with inwardly directed pins or rollers 23 which are received in an annular groove 24 of the hub member 6, whereby the hub 6 and table 7 may be raised and lowered irrespective of the rotation thereof, and also the rotation may take place irrespective of the vertical position of the table 7.

At its upper end, the hub 6 is joined to or made integral with a table supporting member 25 having a plurality of outstanding arms 26, each of which may be provided with a groove 27 communicating between the top of the arm and a substantially rectangular guideway 28. Slide blocks 29 (Figs. 3 and 4)

are arranged to be moved lengthwise of the guideways 28 by screw bolts 30 threaded thereto and adapted to be rotated to move the slide blocks along the guideways by a suitable tool engaging their squared ends 31. Blocks 29 are provided with upstanding pins 32 which are adapted to engage the inner periphery of a form indicated at 33 and here shown substantially oval in contour. It is obvious that forms of various sizes and shapes may be placed upon the arms 26 and held in place by suitable adjustments of the blocks 29 and retaining pins 32.

Forms 33 are preferably substantially L-shaped in cross section, being formed with an upstanding wall 34 and an integral outwardly extending flange 35. A work strip indicated at 36 is adapted to be bent around the outer periphery of the form 33 and to rest against the upstanding wall 34 and the flange 35, the entering end 37 of the strip 36 being engaged by a stop member 38 which may be suitably fastened to the flange 35, as for example by a screw 39, the stop member having a part 40 engaging the end 37 of the work strip 36 to hold it against the wall 34.

Means are provided for bending the work strip about the wall 34 of the form, such means here shown as comprising a roller 41 having a flange 42 to engage the upper edge of the work strip 36 and means for resiliently pressing the roller against the work strip and for adjusting its position to accommodate forms of various sizes. This last means may comprise a fixed support 43 positioned outside the tank and having removably fixed thereon a member 44 provided with a plurality of holes 45, in any one of which a bolt 46 fixed in the support 43 may be inserted, the member 44 being held in place by a suitable nut 47. An arm 48 is slidably received within a U-shaped shackle 49 which may be bolted or otherwise secured to the tank 1 as shown in Fig. 5, a roller 50 being provided on which the arm 48 may rest. The arm 48 is preferably hollow to receive the end of member 44 and is provided with a slot 51 in which is received a pin 52 rigid with the member 44 to prevent the arm 48 rotating. A suitable spring 53 may be provided within the hollow portion of arm 48 and abut against the end of member 44 to force the arm toward the center of the rotatable table. Roller 41 is pivotally mounted on a stub shaft 48' at the inner end of arm 48 as shown in Fig. 7, the axis of the pivot being parallel to that of the hub member 6, so that the peripheral surface of the roller will always be parallel to the wall 34 to bend the strip 36 therebetween.

I provide means for retaining the work strip against the wall 34 only one such means being here shown in a position to engage the rear end of the strip, such means in this instance taking the form of an inverted H-shaped member generally indicated at 54 having a depending arm 55 engageable in a suitable aperture in a slide block 56 which is adapted to be moved along a guideway 57 in one of the arms 26. The guideway 57 communicates with both the upper and lower surface of the arm 26 through suitable slots as shown in Fig. 6, the upper slot providing for the passage of the two upstanding arms of the H-shaped member 54 and the lower slot providing for the dependent arm. One of the upstanding arms 59 of the H-shaped member 54 extends upwardly through a suitable aperture 58 in the flange 35 and constitutes a stop pin for the rear end or other part of the work strip. The other arm 59' is spaced further from the wall 34 and constitutes a depressing member, whereby the stop arm or pin may be depressed to permit the work strip being bent about the wall 34. A spring 60 is provided between the loop of the H-shaped member 54 and an extended portion 61 of the slide member 56 which serves to retain the H-shaped member, including the stop pin 59 in its upper operative position whenever such action is permitted.

While I have only shown one holding member 54 in one of the arms 26 and in a position corresponding to the end of the work strip after it has been formed, I contemplate using as many of these holding members as may be necessary, possibly in each of the arms and even providing more arms if it is desired to hold the spring in more places.

I show in Fig. 9 a modified arrangement of the holding member and roller in which the roller 65 is provided with a groove or rabbet 66 adapted to receive the upper end of the holding pin 59 immediately after the depressing pin 59' has passed the end of the cam 62 so that the holding pin 59 will be in operative position immediately after the roller has formed the spring into the desired shape and so that in a case where the end of the spring only extends by the holding pin a very short distance, it will be securely held. For this purpose the roller 65 and preferably also the roller 41 is provided with a plain bottom surface against which the depressing pin 59' connects after it has been released by the cam 62.

Automatic means are provided for depressing the stop pin 59 comprising a cam 62 which may be formed integral with the arm 48 (Fig. 7), whereby the stop pin will be depressed while the work strip 36 is being bent about the periphery of the form 33 adjacent thereto, the cam terminating in such a position as to permit the spring 60 to bring the stop pin back into normal position to hold the rear end or other part of the strip 36 immediately after it has been bent into the desired shape by the roller 41. Several successive dotted line positions of the depressing member 59' are indicated at 63 in Fig. 7.

From the above description, the operation of the device will be obvious. The table is rotated by the motor 13 until the stop 38 is at or in front of the roller 41 as seen in Fig. 1 when the entering end 37 is placed against the stop behind the extended part 40. The clutch 14 is then engaged by the action of the lever 15 to rotate the table, and the strip 36 is fed in by hand until the table reaches the position shown in Fig. 1 from which time the action will be substantially automatic and further hand feeding of the strip 36 unnecessary. The bending and forming action will continue until one of the depressing arms 59′ come in contact with the cam 62 as shown in Fig. 7 at which time the corresponding H-shaped member 54 will be depressed to permit the strips being bent about the wall 34 over the top of the stop pin. After the depressing pin 59 has passed the cam portion 62 during the continued rotation of the table, the stop pin will again be forced upwardly by the action of the spring 60 to retain the rear end of the work strip 36 in position against the wall 34. The entire rotatable table 7 may then be depressed by a downward movement of the handle 64 of the lever 17 to lower the table 7 and harden or quench the strip.

The parts of this device may be used for forming strips into a grooved shape without the use of a quenching or hardening tank and also the device may be employed with round wire instead of strips and for the purpose of forming curved shaped other than for springs, so that I do not wish the words "spring" or "strip" to be construed as limiting upon the invention or the following claims. Also the tank 1 may be used either for quenching a hot strip of wire or other suitable metal to give it extreme hardness or for tempering by the use of suitable liquids and temperatures thereof.

I claim:

1. A spring forming and hardening machine comprising a tank for containing a hardening liquid, a relatively rotatable forming table mounted above the surface of the liquid in the tank, means to rotate the table in a plane parallel to the surface of the liquid, means to raise and lower the table, means adjacent to the periphery of the table for engagement with the entering end of a work strip, and automatic means cooperating with the table for bending the strip about the periphery thereof and for retaining it in position thereon while in the tank.

2. A spring forming and hardening machine comprising a tank adapted to contain a hardening liquid, a relatively rotatable table support, means to rotate the support above an axis, means to raise and lower the support on said axis in the tank, a form removably held on such support having its periphery the shape of the spring to be formed and normally above the surface of the liquid in the tank, means on the support for securing and positioning forms of various shapes and sizes, means on the periphery of the form for engagement with the entering end of a work strip, and automatic means cooperable with forms of various sizes and shapes for bending the strip about the periphery of the form and for retaining it in position thereon while in the tank.

3. A spring forming and hardening machine comprising a tank for containing a hardening liquid, a form table mounted for rotation above the surface of the liquid in the tank, means to rotate the table, means to lower the entire table below the surface of the liquid in the tank, means adjacent to the periphery of the table for engagement with the entering end of a work strip, and means for bending the strip about the periphery of the form and for retaining the strip against said periphery when the table is lowered and the strip is below the surface of the liquid.

4. A spring forming and hardening machine comprising a tank for containing a hardening liquid, a relatively rotatable table, means to rotate the table, means to raise and lower the table in the tank, means adjacent to the periphery of the table for engagement with the entering end of a work strip, automatic means cooperating with the table for bending the strip about the periphery thereof, and automatic means for retaining the strip against the form during the hardening process.

5. A spring forming and hardening machine comprising a tank for containing a hardening liquid, a relatively rotatable table, means to rotate the table, means to raise and lower the table in the tank, means adjacent to the periphery of the table for engagement with the entering end of a work strip, a roller mounted on an axis parallel to that of the table, resilient means to force the roller toward the table to bend the work strip about the periphery thereof, and automatically operating means for retaining the work strip against the periphery of the table after it has been bent into shape.

6. A spring forming and hardening machine comprising a tank adapted to contain a hardening liquid, a relatively rotatable table support, means to rotate the support, means to raise and lower the support in the tank, a form removably held on said support having its periphery the shape of the spring to be formed, means on the support for securing the positioning forms of various shapes and sizes, means on the periphery of the form for engagement with the entering end of a work strip, a fixed support at one side of the form, a member on said fixed support and securable thereto in a plurality of adjusted positions toward and away from the axis of the table support, an arm slidably mounted with respect to said member having a roller at its outer end cooperable with the periphery of the form to bend the work strip thereabout, and resilient means associated with said arm to urge the roller toward the form.

7. A spring forming and hardening machine comprising a tank adapted to contain a hardening liquid, a relatively rotatable table support, means to rotate the support, means to raise and lower the support in the tank, a form removably held on said support having its periphery the shape of the spring to be formed, means on the support for securing and positioning forms of various shapes and sizes, means on the periphery of the form for engagement with the entering end of a work strip, a roller mounted on an axis parallel to that of the table support, and adapted to cooperate with the periphery of the form to bend the work strip thereabout, resilient means to force the roller toward the support, means for adjusting the position of said resilient means toward and away from the table support, whereby to accommodate forms of various sizes, and a depressible stop adjacent to the periphery of the form and adapted to be depressed to permit the work strip to be bent about the form and thereafter to be raised to normal position to retain the strip between it and the form.

8. A spring forming machine comprising a rotatable table whose periphery is shaped to correspond with the spring to be formed, means on the periphery for engaging the entering end of a work strip, means for rotating the table, a roller spring pressed toward the periphery of the table cooperable therewith to bend the strip thereabout, a depressible stop adjacent to the part of the periphery of the table adjacent to the rear end of the strip after it has been formed, automatic means to depress said stop while the strip is being bent about the periphery of the table adjacent thereto, and means to bring the stop into operative position to hold the strip after forming.

9. A spring forming machine comprising a rotatable support having a plurality of radial arms thereon, a form adapted to be removably received on said arms, means associated with said arms for holding forms of various sizes and shapes, means for engaging the entering end of a work strip and holding it against the periphery of the form, resilient means cooperating with said periphery for bending the strip thereabout, a member having an upstanding arm adjacent to said periphery to serve as a stop and hold the rear end of the strip against said periphery and a second upstanding arm spaced further away from said periphery to serve as a depressing pin, a radial groove in one of said radial arms, and a slide in said groove carrying said member, whereby to accommodate forms of various sizes and shapes.

10. A spring forming machine comprising a rotatable support having a plurality of radial arms thereon, a form adapted to be removably received on said arms, means associated with said arms for holding forms of various sizes and shapes, means for engaging the entering end of a work strip and holding it against the periphery of the form, resilient means cooperating with said periphery for bending the strip thereabout, a member having an upstanding arm adjacent to said periphery to serve as a stop and hold the rear end of the strip against said periphery and a second upstanding arm to serve as a depressing pin, a cam associated with said resilient means for depressing said pin and member whereby the stop arm is depressed to permit the strip to be bent about said periphery, and resilient means to return the stop arm into operative position to hold the rear end of said strip after the depressing pin has been released by said cam and the strip bent about said periphery.

11. A spring forming and hardening machine comprising a tank for containing a hardening fluid, a rotatable support having a plurality of radial arms thereon, a form adapted to be removably received on said arms, means associated with said arms for holding forms of various sizes and shapes, means for raising and lowering the form into the tank, means for engaging the entering end of a work strip and holding it against the periphery of the form, a fixed support at one side of the form, a member securable to said fixed support in a plurality of adjusted positions toward and away from the axis of the table support, an arm slidably mounted with respect to said member having a roller at its outer end cooperable with the periphery of the form to bend the work strip thereabout, resilient means associated with the roller supporting arm to urge the roller toward the form, an H-shaped member having one of its parallel arms upstanding adjacent to said periphery to serve as a stop and hold the rear end of the strip against said periphery and the other parallel arm spaced from the periphery to serve as a depressing pin, a radial groove in one of said radial arms, and a slide in said groove carrying said H-shaped member, whereby to accommodate forms of various sizes and shapes, a cam for depressing said H-shaped member, whereby the stop arm may be depressed to permit the strip to be bent about said periphery, and resilient means to return the stop arm into operative position to hold the rear end of said strip after the depressing pin has been released by said cam and the strip bent about said periphery.

12. A strip forming and hardening machine comprising in combination with a tank for containing a hardening material, a table supported above the surface of the liquid in said tank, means for rotating said table above the surface, means cooperating with said table for bending a strip around the periphery thereof as said table is so rotated and for retaining it in such position and means for lowering said table with the bended strip retained thereon in such position below the surface of the liquid in said tank.

Signed by me at Boston, Massachusetts this 15th day of July, 1927.

A. D. BACH.